United States Patent [19]
Jacobs et al.

[11] Patent Number: 5,700,337
[45] Date of Patent: Dec. 23, 1997

[54] FABRICATION METHOD FOR COMPOSITE STRUCTURE ADAPTED FOR CONTROLLED STRUCTURAL DEFORMATION

[75] Inventors: Jack H. Jacobs, St. Louis, Mo.; Matthew M. Thomas, Madison, Ill.; Duane D. Grosskrueger, Highlands Ranch; Bernie F. Carpenter, Littleton, both of Colo.; Alan R. Perry, Morrison, Colo.

[73] Assignees: McDonnell Douglas Corporation, St. Louis, Mo.; Lockheed Martin Corporation, Bethesda, Md.

[21] Appl. No.: 609,468

[22] Filed: Mar. 1, 1996

[51] Int. Cl.$^6$ .................................................. B32B 31/00
[52] U.S. Cl. .............. 156/64; 156/161; 156/163; 156/272.8; 156/273.9; 156/298; 156/299; 156/300; 156/312; 264/229; 264/230; 264/480
[58] Field of Search ............ 156/64, 161, 163, 156/272.2, 272.8, 273.7, 273.9, 275.5, 298, 299, 300, 312; 264/230, 229, 480; 425/111

[56] References Cited

U.S. PATENT DOCUMENTS

| | | | |
|---|---|---|---|
| 2,372,929 | 4/1945 | Blessing | 156/273.9 X |
| 3,560,291 | 2/1971 | Foglia et al. | 156/272.8 X |
| 3,895,162 | 7/1975 | Lemont et al. | 264/229 X |
| 4,405,553 | 9/1983 | Lovgren et al. | 264/230 X |
| 4,673,450 | 6/1987 | Burke | 156/273.9 X |
| 5,058,497 | 10/1991 | Bishop et al. | 100/155 R |
| 5,096,530 | 3/1992 | Cohen | 156/272.8 X |
| 5,348,602 | 9/1994 | Makarenko et al. | 156/161 |

FOREIGN PATENT DOCUMENTS

| | | | |
|---|---|---|---|
| 2140634 | 2/1973 | Germany | 156/161 |
| J6 2044-429-A | 2/1987 | Japan | 156/272.8 |

OTHER PUBLICATIONS

Sharp, R., et al., Material Selection/Fabrication Issues for Thermoplastic Fiber Placement, *J. of Thermoplastic Composite Materials*, vol. 8, pp. 2–14 (Jan. 1995).

Thomas, Matthew M., et al., Manufacturing of Smart Structures Using Fiber Placement Manufacturing Processes, *SPIE*, vol. 2447 p. 266 (1995).

*Primary Examiner*—David A. Simmons
*Assistant Examiner*—Paul M. Rivard
*Attorney, Agent, or Firm*—Bell Seltzer Intellectual Property Group of Alston & Bird LLC

[57] ABSTRACT

A composite structure and related fabrication method is provided which has a plurality of composite material layers and at least one embedded shape memory alloy component for providing controlled structural deformation. The shape memory alloy component includes a shape memory alloy tendon having a relaxed shape at temperatures below a predetermined transition temperature and a contracted shape at temperatures above the predetermined transition temperature. The shape memory alloy component also comprises a pair of electrically insulating opposing face sheets adhered to opposite sides of the shape memory alloy tendon to electrically isolate the shape memory alloy tendon from the surrounding composite material layers. The shape memory alloy component is embedded within the plurality of composite material layers such that raising the temperature of the shape memory alloy tendon above the transition temperature creates a controlled structural deformation of both the shape memory alloy component and the surrounding composite material layers.

10 Claims, 3 Drawing Sheets

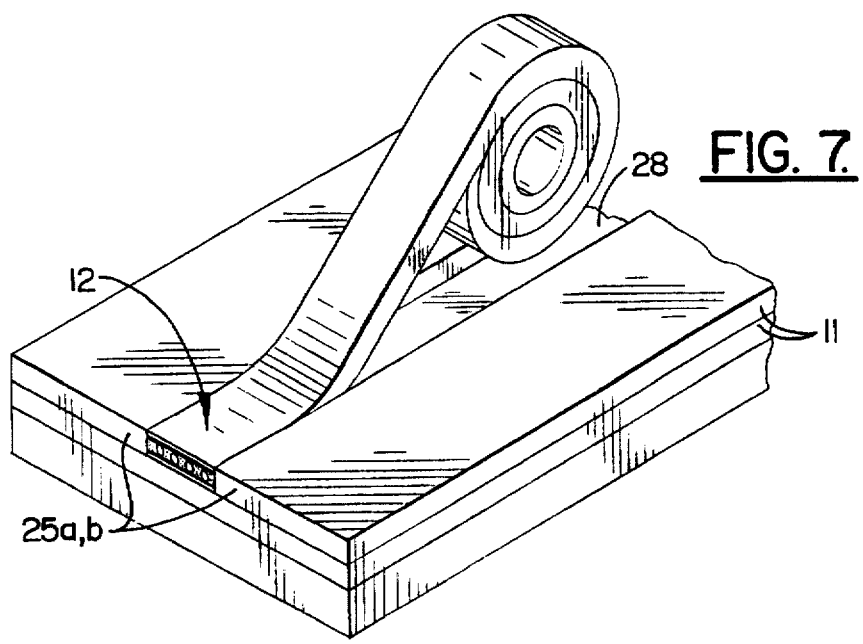
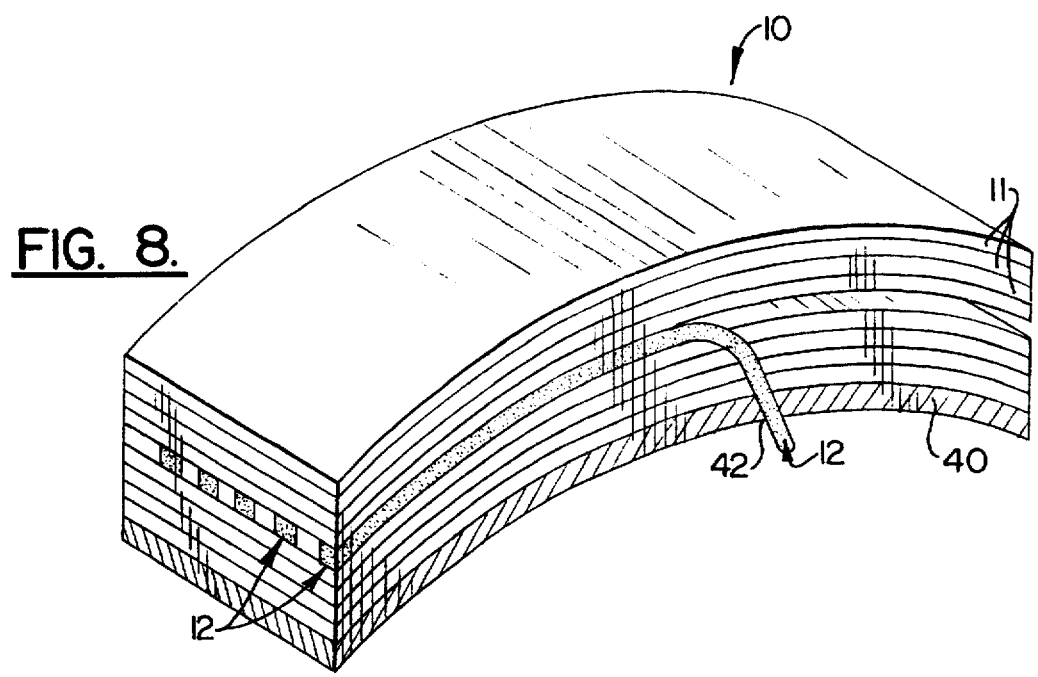

FABRICATION METHOD FOR COMPOSITE STRUCTURE ADAPTED FOR CONTROLLED STRUCTURAL DEFORMATION

GOVERNMENT RIGHTS

The United States Government may have rights in this invention pursuant to ARPA Agreement No. MDA 972-93-2-0010 awarded by the Advanced Research Projects Agency.

FIELD OF THE INVENTION

The present invention relates generally to composite structures and associated fabrication methods and, more particularly, to composite structures adapted for controlled structural deformation and associated fabrication methods.

BACKGROUND OF THE INVENTION

In many industries wherein weight is a limiting performance parameter such as in the aircraft or automobile industries, reinforced composite materials are fast becoming a light-weight and cost effective alternative to conventional metallic materials such as aluminum, titanium, and the like. In high stress applications, composite materials are typically formed of thermoplastic resins which are reinforced with fibers such as carbon. The carbon fibers act to strengthen, i.e., "reinforce", the thermoplastic resin. Thus, the reinforced composite materials have increased strength and are better able to withstand higher temperatures and higher pressures than a non-reinforced resin—all the while saving unwanted pounds in comparison with conventional structural materials.

Although composite materials have many advantages, they are not without problems which typically include processing difficulties and material deficiencies introduced during the manufacturing process. These material deficiencies can include voids created during the fabrication of a composite structure and other material deficiencies as a result of a fiber/resin interruption. Regardless of the origin, material deficiencies can introduce serious performance problems.

Notwithstanding the criticality of minimizing irregularities in the composite materials, such as voids and fiber inclusions or the like, so as to maintain the integrity of the composite structure, composite components can be manufactured in a variety of ways depending upon the particular application of the composite component. For example, large and complex composite structures can be fabricated by laying up or stacking a number of composite plies on an underlying tool or mandrel which, at least partially, defines the shape of the resulting composite structure. The plies are thereafter consolidated by placing the structure, under pressure, into an autoclave (or oven) to heat the material to a sufficient temperature and for a sufficient time to insure resin flow and bonding of the plies into an integral laminate composite structure.

It is also known to those skilled in the art to form composite parts by employing a fiber placement process. See, for example, Richard Sharp, et al., *Selection/Fabrication Issues for Thermoplastic Composite Fiber Placement*, J. of Thermoplastic Composite Materials, Vol. 8, pp. 2–14 (January 1995). According to a conventional fiber placement process, one or more ribbons of composite material (also known as a composite tow) are laid down on a substrate. The substrate may be a tool or mandrel, but, more conventionally, is formed of one or more underlying layers of composite material which have been previously laid down and consolidated. A conventional fiber placement process utilizes a directed laser heat source to consolidate the plies of composite material at a localized nit point. In particular, the ribbon of composite material and the underlying substrate are heated at the nit point to melt the resin and are simultaneously compacted to insure consolidation. For example, the ribbons of composite material can be compacted by a compliant pressure roller as described by U.S. Pat. No. 5,058,497 to James C. Bishop, et al. To complete the part, additional layers of composite material can be applied in a side-by-side manner and can be subjected to localized heat and pressure during the consolidation process. See Matthew M. Thomas et al., *Manufacturing of Smart Structures Using Fiber Placement Manufacturing Processes*, 2447 SPIE 266 (1995).

As described above, the nit point is held for a very short time at relatively high temperatures and pressures. As such, the layered or stacked plies are successively exposed to relatively high temperatures and pressures in order to sufficiently bond the plies of composite material into the integral laminate structure—without any need for a post-process autoclave step. Nevertheless, the consolidation of carbon-fiber reinforced plies by a fiber placement process typically requires temperatures in excess of 1200° F. and high compactive pressures as great as 600–800 PSI.

Irrespective of the fabrication method, it is desirable in many applications for structural components, such as composite parts, to undergo controlled structural deformation. For example, the controlled structural deformation of a structural component can dampen vibrational responses induced by external forces so as to control material fatigue in structures or can provide adaptive aircraft control surfaces. The structural deformations are conventionally created with mechanical actuators, but these mechanical devices add system weight and complexity.

Alternatively, structural components can include shape memory alloy to perform mechanical work such as structural displacement and stiffening. Shape memory alloy is an alloy which has a first shape at temperatures above a predetermined transition temperature and a second shape at temperatures below the predetermined transition temperature. When the shape memory alloy is heated to the predetermined transition temperature, the shape memory alloy "remembers" its original shape and stiffens and contracts to its original heat-treated shape. Thus, if the shape memory alloy is embedded within a structural component, the structural component will deform in a controlled or predictable manner as a result of the stiffening of the shape memory alloy upon being heated to temperatures above the predetermined transition temperature.

In the past, shape memory alloy wires were individually embedded directly within the composite materials in an attempt to provide controlled structural deformation. Because carbon reinforced composite materials are conductive, however, any heating of a shape memory alloy wire could also heat other shape memory alloy wires which were in electrical contact with the composite structure, thereby creating secondary and unwanted actuation of the other shape memory alloy wires. In order to control the actual deformation of the composite part occasioned by actuation of a first shape memory alloy wire, the shape memory alloy wires must therefore be electrically and thermally isolated from the remainder of the composite structure and from the remainder of the shape memory alloy wires.

In order to provide this electrical and thermal isolation, shape memory alloy wires have been individually sheathed or clad with a dielectric coating. This cladding process is typically time-consuming, hard to control, labor intensive and generally not suitable for a manufacturing environment. In embodiments in which the shape memory alloy takes the form of a shape memory alloy wire, attempts to electrically and thermally isolate the shape memory alloy wire, such as by disposing the shape memory alloy wire within slip fit sheath insulation, could deform the wire and thereby induce malfunctions in any related structural movement.

In addition, the wires, sheathing, and cladding were oftentimes not sufficiently robust to withstand the high pressures and temperatures typically encountered in the consolidation phase of a composite fabrication process. Moreover, the embedding of shape memory alloy directly into the composite material could create dimensional mismatches within the composite plies which, in turn, could create voids within the composite material, thereby diminishing the structural integrity and strength of the composite material. For example, voids may be created around shape memory alloy wires which are embedded within a composite structure since the size and shape of the shape memory alloy wires do not match the size and shape of the composite plies. These dimensional mismatches between the shape memory alloy and the composite plies and the resulting decrease in structural integrity are particularly evident in composite structures fabricated by a fiber placement process in which the shape memory alloy wires are typically much smaller than the ribbons of composite material which are laid down to create the resulting composite structure.

SUMMARY OF THE INVENTION

It is therefore an object of the present invention to provide a shape memory alloy component which can be efficiently embedded within a composite structure in order to provide controlled structural deformation of the composite structure.

It is another object of the present invention to provide a composite structure having a shape memory alloy component which can be reliably isolated, both electrically and thermally, from the remainder of the composite structure.

It is a further object of the present invention to provide a composite structure which includes a shape memory alloy component which does not impair the structural integrity and strength of the composite structure.

It is yet another object of the present invention to provide an improved method of fabricating a composite structure which is adapted for controlled structural deformation.

These and other objects are provided, according to the present invention, by a composite structure having a number of composite material layers and an embedded shape memory alloy component which includes a shape memory alloy tendon disposed between a pair of electrically insulating face sheets. The shape memory alloy component is preferably embedded within the composite material layers such that the shape memory alloy tendon can be externally actuated. By actuating the shape memory alloy tendon, such as by raising the temperature of the shape memory alloy tendon above a predetermined transition temperature, the shape memory alloy tendon contracts to create a controlled structural deformation of both the shape memory alloy component and at least a portion of the composite structure.

The shape memory alloy tendon can have a variety of configurations, such as a number of shape memory alloy wires or a shape memory alloy foil. Regardless of the particular configuration, the shape memory alloy tendon is disposed between a pair of electrically insulating face sheets, such as a pair of face sheets formed of a thermoplastic material, such as polyetheretherketone and polyetherimide, in order to effectively isolate the shape memory alloy tendon from the remainder of the composite structure. The face sheets are preferably adhered to opposite sides of the shape memory alloy tendon to form an integral shape memory alloy component. In addition to adhering the face sheets to the shape memory alloy tendon, the adhesive is also preferably disposed along the opposed side edges of the shape memory alloy component to further electrically isolate the shape memory alloy tendon from the remainder of the composite structure.

According to the fabrication method of the present invention, the shape memory alloy component is formed and is subsequently embedded within a plurality of layers of composite material. In order to form the shape memory alloy component, a shape memory alloy tendon is adhered between a pair of electrically insulating face sheets. In the embodiment of the present invention in which the shape memory alloy tendon is formed of a number of shape memory alloy wires, tension is preferably applied to the shape memory alloy wires while the adhesive cures such that the shape memory alloy wires are maintained in a predetermined alignment, such as a predetermined spaced-apart and parallel alignment. In addition, the adhesive is preferably cured at reduced pressures in order to decrease void formation within the adhesive.

Once the shape memory alloy component has been formed, the shape memory alloy component can be embedded within the composite material layers. While the composite material layers can be laid up and consolidated according to conventional autoclave fabrication methods, one advantageous embodiment of the fabrication method forms the composite structure according to a fiber placement process. According to this embodiment, a number of ribbons of composite material are placed in a side-by-side manner on an underlying composite material layer. The plurality of composite material ribbons are then consolidated to the underlying composite material, such as by heating the composite material ribbons with a laser source.

According to one embodiment of the present invention, the shape memory alloy component is preferably inserted between a pair of composite material ribbons during the fiber placement process. According to another embodiment of the present invention, the composite material ribbons can be placed on the underlying composite material layer so as to define a trough between a pair of adjacent composite material ribbons. The shape memory alloy component can then be inserted within the trough defined between the pair of adjacent composite material ribbons.

Regardless of the manner in which the shape memory alloy component is inserted, additional ribbons of composite material can then be placed in a side-by-side manner on the shape memory alloy component. Preferably, the shape memory alloy component extends in a first predetermined direction and the additional ribbons of composite material which are placed on the shape memory alloy component extend in a second predetermined direction, different than the first predetermined direction. Thus, during the subsequent consolidation of the overlying composite material layers, the embedded shape memory alloy component is at least somewhat protected from the elevated temperatures required for consolidation.

Accordingly, the composite structure of the present invention includes an embedded shape memory alloy tendon which is electrically and thermally isolated from the remainder of the composite structure to provide controlled structural deformation of predetermined portions of the composite structure. In addition, the fabrication method of the present invention allows the shape memory alloy component to be readily embedded within a composite structure, such as during a fiber placement process, without actuating or otherwise damaging the shape memory alloy component and without impairing the structural integrity or strength of the composite structure. Thus, a structurally deformable composite structure can be efficiently fabricated in a manufacturing environment according to the fabrication method of the present invention.

BRIEF DESCRIPTION OF THE DRAWINGS

FIG. 7 is a perspective view illustrating the insertion of a shape memory alloy component of the present invention within a trough defined between a pair of adjacent composite material ribbons according to one embodiment of the fabrication method of the present invention.

FIG. 8 is a perspective view of a portion of a composite structure according to the present invention illustrating the surface egress of the shape memory alloy component of the present invention from the resulting composite structure.

DETAILED DESCRIPTION OF THE PREFERRED EMBODIMENTS

Figure 1:
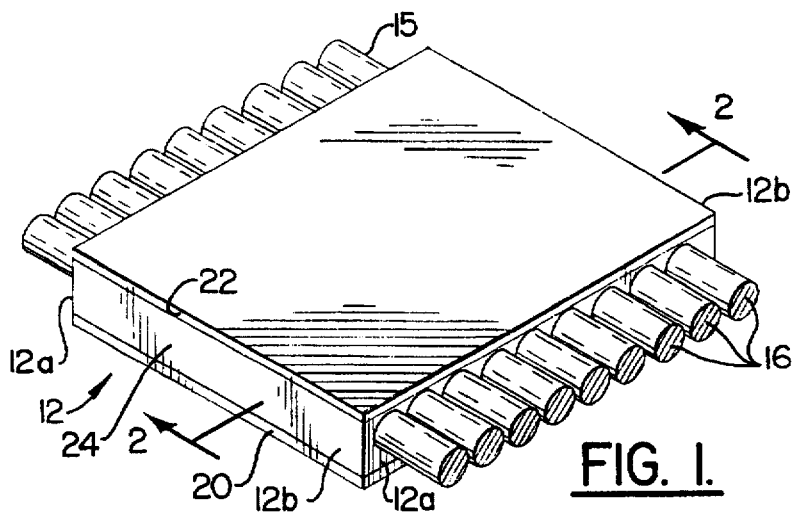
FIG. 1 is a perspective view of a shape memory alloy component of one embodiment of the present invention in which the shape memory alloy tendon includes a number of shape memory alloy wires disposed between a pair of face sheets.

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. In the drawings, the thickness of the respective layers are exaggerated for clarity. Like numbers refer to like elements throughout.

Referring now to FIG. 1, a shape memory alloy component 12 according to the present invention is illustrated. One common type of shape memory alloy component 12 known by those of skill in the art is a shape memory alloy tow or actuator. The shape memory alloy component 12 comprises a shape memory alloy tendon 15 disposed between a pair of electrically insulating face sheets 20, 22. As best illustrated by FIG. 8, the shape memory alloy component 12 is preferably embedded within a number of composite material layers 11 such that the shape memory alloy tendon 15 can be externally actuated. By actuating the shape memory alloy tendon 15, such as by raising the temperature of the shape memory alloy tendon 15 above a predetermined transition temperature, the shape memory alloy tendon 15 contracts to create a controlled structural deformation of both the shape memory alloy component 12 and at least a portion of the resulting composite structure 10.

Figure 4:
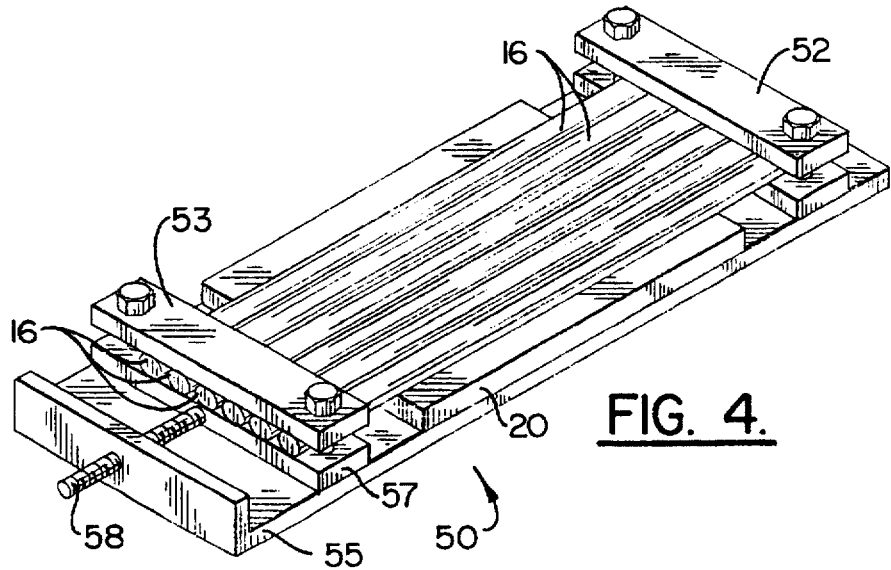
FIG. 4 is a perspective view illustrating the formation of a shape memory alloy component of one embodiment of the present invention in which tension is applied to a number of shape memory alloy wires.

The shape memory alloy tendon 15 is predominantly comprised of Nickel and Titanium but can include of a number of other elements, such as Copper, Zinc and Aluminum. It is the ratio of Nickel to Titanium present in the alloy that primarily determines the transition temperature. The shape memory alloy tendon 15 must be trained to the desired "contracted" shape. This training or conditioning of the shape memory alloy tendon 15 can typically be performed in one of two ways by mechanically stretching or prestraining the shape memory alloy tendon 15 as illustrated by FIG. 4, or by heat treating. Although the amount of Nickel and Titanium in the alloy primarily controls the resultant transition temperature, as is known to those of skill in the art, the amount and type of conditioning performed on the shape memory alloy tendon 15 also impacts the ultimate transition temperature. In this regard, shape memory alloy is commercially available from sources such as Shape Memory Applications, Inc. of Santa Clara, Calif. This source also provides kits which help establish how the material responds to conditioning.

Typically, the shape memory alloy tendon 15 is in a martensitic or "relaxed" crystalline state at ambient temperature and when heated above the transition temperature reverts to an austenitic or "contracted" state. As known to those skilled in the art, the relative difference in shape of a shape memory alloy between its relaxed state and its contracted state is around 4%–8% and the shape memory alloy can be prestrained in either a uniform or segmented manner. The segmented conditioning allows the shape memory alloy component 12 to be embedded to deform only a certain area. As such, this segmented approach concentrates the deformation effect into a desired area and allows for a more sophisticated deformation pattern.

As also known to those skilled in the art, the transition temperature as discussed above is typically a function of the composition of the shape memory alloy material as well as the conditioning performed on the shape memory alloy tendon 15, with transition temperatures ranging from ambient temperatures to both above and below ambient temperatures. However, it will be appreciated that the composition of the shape memory alloy should preferably be selected such that the transition temperature is high enough that the shape memory alloy will not be actuated under normal operating or fabrication conditions, but will, instead, require additional heating in order to be actuated. Therefore, while it is understood that transition temperatures can be any number of temperatures, it is preferred that the shape memory alloy composition be such that the transition temperature is from about 100°–250° F., and more preferably that the austenite finish temperature be from about 200°–250° F.

Figure 2:
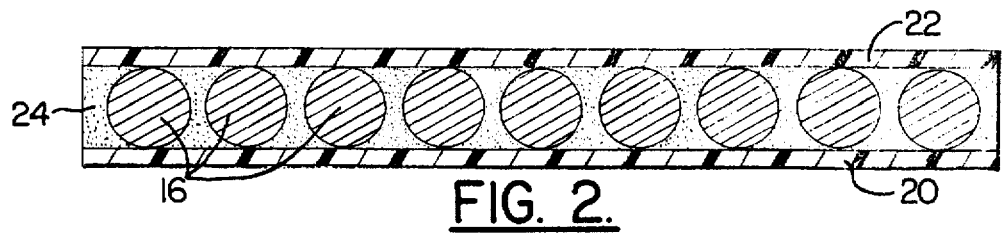
FIG. 2 is a cross-sectional view of the shape memory alloy component of FIG. 1 taken along line 2—2 and illustrating the adhesion of the face sheets to the shape memory alloy wires.
Figure 3:
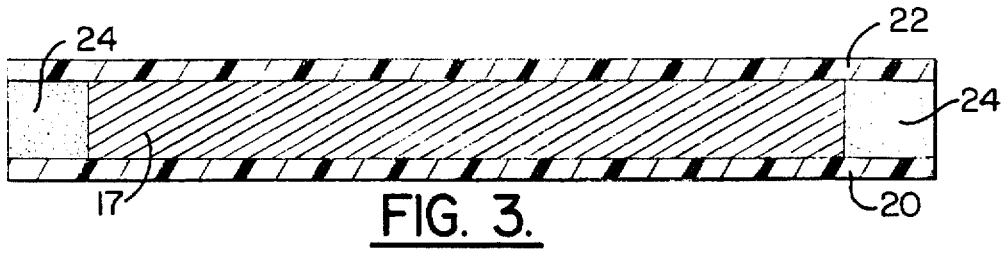
FIG. 3 is a cross-sectional view of a shape memory alloy component of another embodiment of the present invention in which the shape memory alloy tendon is a shape memory alloy foil adhered between a pair of face sheets.

As illustrated by FIGS. 1, 2, and 3, the shape memory alloy tendon 15 can have a variety of configurations such as a plurality of shape memory alloy wires 16 or a shape memory alloy foil 17. Although the shape memory alloy tendon of FIGS. 1 and 2 could have any number of shape memory alloy wires, one embodiment of the shape memory alloy tendon includes between 3 and 10 wires. Regardless of the particular configuration, however, the shape memory alloy tendon 15 is disposed between a pair of electrically insulating face sheets 20, 22. The electrically insulating first and second face sheets 20, 22 are preferably comprised of a thermoplastic material such as polyetheretherketone (PEEK) or polyetherimide in order to effectively isolate the shape memory alloy tendon 15 from the remainder of the composite structure 10. Regardless of the material, the face sheets preferably provide not only electrical isolation, but also thermal isolation in order to prevent actuation of other shape memory alloy components within the composite structure upon heating of one particular shape memory alloy tendon.

As illustrated in FIGS. 1, 2 and 3, the first and second face sheets 20, 22 are adhered to opposite sides of the shape memory alloy tendon 15 to effectively sandwich and contain the shape memory alloy tendon 15 (16, 17) therebetween. The face sheets 20, 22 are bonded to the shape alloy memory tendon 15 with an adhesive 24. Although any number of adhesives would provide the necessary bonding, it is preferred that the adhesive be curable at or around room temperature. For example, the adhesive can be a two-part urethane.

In order to further isolate the shape memory alloy tendon and to prevent secondary actuation of other shape memory alloy tendons, the adhesive is also preferably electrically and thermally insulating. In the embodiment of FIGS. 1 and 2, the shape memory alloy wires are preferably separated by the adhesive such that each shape memory alloy wire can be individually actuated without also heating and therefore actuating other shape memory alloy wires of the shape memory alloy tendon. In addition, the layer of adhesive between the shape memory alloy tendon and the face sheets further isolates the shape memory alloy tendon from the surrounding composite material. One acceptable commercially available adhesive is Ciba Geigy Uralane 5774® adhesive.

As best illustrated in FIG. 1, the face sheets 20, 22 have opposed end edges 12a and opposed side edges 12b. In addition, the shape memory alloy tendon 15 extends outwardly from the opposed end edges 12a so as to provide external access for electrical connection or heating during actuation of the shape memory alloy tendon. In contrast, it is preferred that the shape memory alloy component 12 tendon be encapsulated with an adhesive 24 along the opposed side edges 12b so as to further insulate the shape memory alloy tendon 15 from the composite structure and any adjacent shape memory alloy tendons, thereby preventing any electrical contact (or shorts) along the length of the shape memory alloy tendon 15. This encapsulating adhesive is particularly advantageous as the length of the shape memory alloy component 12 increases since an elongated shape memory alloy tendon, such as a shape memory alloy wire, can be somewhat difficult to align and the side edges of the shape memory alloy tendon may otherwise contact the adjacent composite layers.

In order to fabricate the shape memory alloy component 12, a first face sheet 20 is positioned on a support which is typically disposed within a vacuum chamber or is capable of pulling a vacuum. The shape memory alloy tendon 15 is then positioned over the first face sheet 20. The adhesive, typically a two part Urethane, is mixed and lathered over the shape memory alloy tendon 15 such that the adhesive 24 makes good contact with both the first face sheet and the shape memory alloy tendon 15. The second face sheet 22 is subsequently positioned over and adhered to the shape memory alloy tendon 15 so as to sandwich the shape memory alloy tendon 15 therebetween. The shape memory alloy component assembly is then cured at room temperature for a predetermined period of time, such as 20 minutes. The shape memory alloy component assembly is preferably cured at increased pressure in order to minimize the number and size of voids within the shape memory alloy component 12. For example, one can increase the pressure on the adhesive by placing a vacuum bag over the shape memory alloy component 12 and reducing the internal pressure thereby building the pressure upon the shape memory alloy component to up to about 1 atm. The increased pressure can also be provided with increased weight, i.e., mechanically applied with external compression such as with the use of hydraulics.

In order to insure that the shape memory alloy wires of the embodiment of FIGS. 1 and 2 do not contact one another, the alignment of the plurality of shape memory alloy wires 16 in a generally spaced apart and parallel arrangement is preferably maintained during the assembly and cure process. Therefore, as illustrated in FIG. 4, it is preferred that tension be applied to the shape memory alloy wires 16 during the assembly and curing process. For example, the tension can be provided by a tension and alignment tool 50. As illustrated, the tool provides clamps 52, 53 for engaging the opposing ends of the shape memory alloy wires. As described below, at least one of the clamps is preferably movable relative to an underlying platform 55. The tool 50 can also include a tension tightening means such as a fixed block 57 which is secured to the platform and a threaded connector or screw 58 which interconnects the movable clamp and the fixed block. By advancing the connector, the spacing between the fixed block and the movable clamp can be adjusted, thereby also adjusting the tension on the wires. However, other means of providing tension to the shape memory alloy wires during the fabrication process can be employed without departing from the spirit and scope of the present invention.

The shape memory alloy component 12 can have various shapes and sizes. However, in one advantageous embodiment of the present invention, the shape memory alloy component 12 is an elongated ribbon. For example the shape memory alloy component may be 8 feet long×0.25 inches wide×0.020 inches thick. In addition, in the embodiment of FIGS. 1 and 2, the shape memory alloy wires can have various lengths and diameters. However, the shape memory alloy wires of one embodiment have a diameter of between about 0.001 inches and about 0.250 inches and, more preferably, between about 0.005 inches and about 0.010 inches.

Figure 5A:
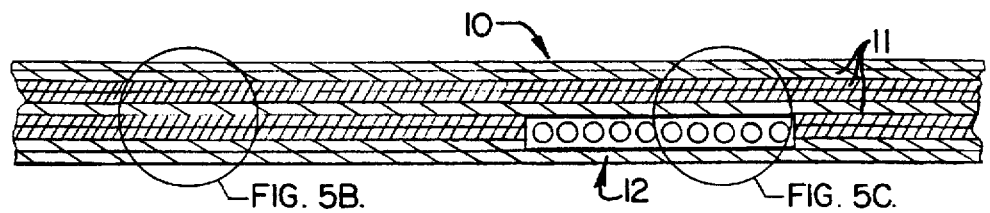
FIG. 5A is a cross-sectional view of a composite structure according to the present invention which includes an embedded shape memory alloy component.

As best illustrated in FIG. 5A, it is also preferable that the width of the shape memory alloy component 12 be generally the same as the width of the ribbons or plies of composite material which surround the embedded shape memory alloy component 12. As described below, it is also preferable that the shape memory alloy component 12 have the same depth or thickness as the plies or ribbons of composite material in which the shape memory alloy component is embedded. By sizing the shape memory alloy component and the plies or ribbons of composite material similarly and, more preferably, identically, the fabrication process is simplified by providing a tight fit between the shape memory alloy component and the surrounding plies or ribbons of composite material, thereby minimizing voids within the resulting composite structure. Additionally, providing a trough 28 which is deep enough to keep the shape memory alloy component 12 flush with the adjacent layers of ribbon 25 will help minimize stress placed on the shape memory alloy component 12 upon fiber placement pressure application. Accordingly, the structural integrity and strength of the composite structure is enhanced. Although it is preferable that the dimensions of the shape memory alloy component 12 be approximately equivalent to the adjacent composite material ribbons, it will be appreciated by those of skill in the art that the size of the shape memory alloy component 12 is not limited thereto and can be any number of desirable sizes with the only limitation being that excessively large shape memory alloy components may weaken the resulting composite structure.

Figure 6:
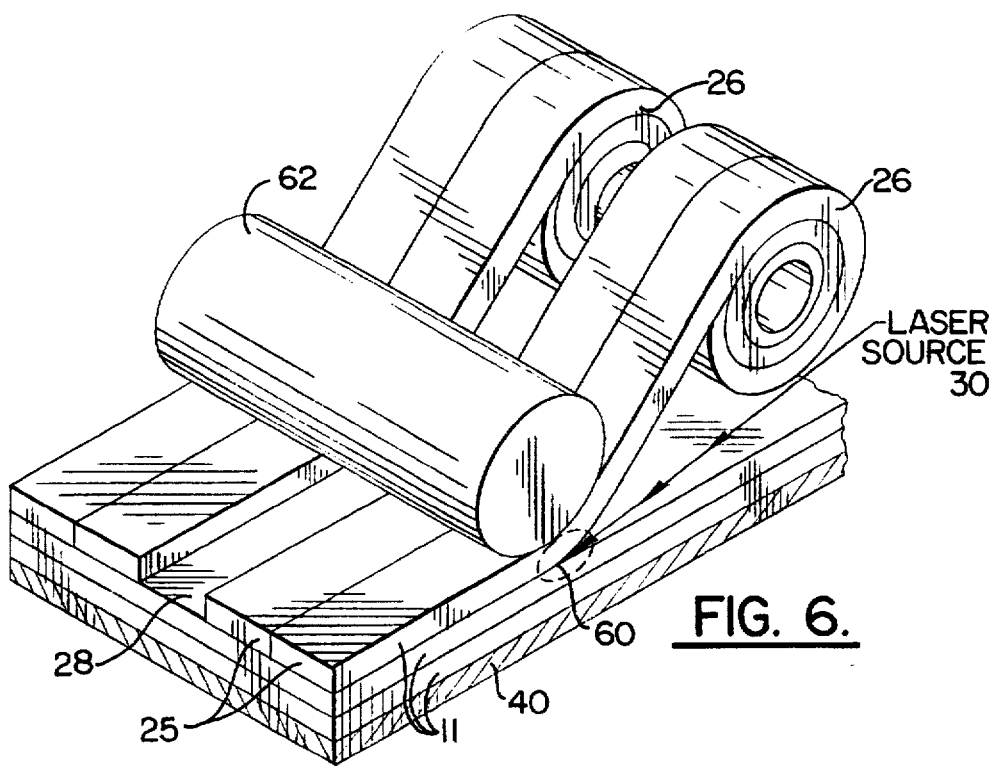
FIG. 6 is a perspective view illustrating the placement of a plurality of ribbons of a composite material upon an underlying composite material layer during a fiber placement process according to one embodiment of the present invention.

Generally described, and as best illustrated by FIG. 6, the composite structure is fabricated by a process which heats and consolidates the resin. Although the specification will primarily describe the fabrication method of the present invention in the context of a fiber placement process, it will be understood by those of skill in the art that the process of embedding the shape memory alloy component of the present invention within a composite structure can be performed by a variety of other composite fabrication process, such as a conventional autoclave curing process in which a number of stacked plies are heated at reduced pressures to consolidate the plies. Regardless of the fabrication method, however, the shape memory alloy component is preferably sufficiently thermally isolated such that the heat employed during the consolidation of the composite plies or ribbons does not actuate the embedded shape memory alloy component, as described in more detail hereinafter.

In the fiber placement embodiment of the present invention, a ribbon of composite material is initially laid down on a tool, such as a cylindrical mandrel. Thereafter, additional ribbons of composite material are laid down on an underlying composite material layer. Typically, the composite material ribbon is drawn from a spool or creel to a nit point at which the composite material ribbon contacts the underlying composite material layer. The composite material is heated and consolidated at the nit point 60. Typically, a laser heat source 30 is focused at the nit point 60 to heat and flow the resin in a polymer melt region. A compaction roller 62 simultaneously compacts the heated composite material and provides pressure at the nit point 60 in the polymer melt region. This pressure and heat bonds the underlying composite material layer 11 with the ribbon of composite material 25 at the nit point 60. While the placement of a single ribbon of composite material is described above, a number of ribbons of composite material, such as four ribbons as shown in FIG. 6, are generally placed simultaneously on the substrate in a side-by-side manner so as to expedite the fabrication process. The plurality of ribbons of composite material are then heated and consolidated as described above.

The composite material ribbons 25 are built up to create a plurality of composite material layers 11. Thus, the composite structure 10 of the present invention typically includes a plurality of composite material layers 11 and an intermediate layer which includes at least one embedded shape memory alloy component 12. As shown, it is preferred that the shape memory alloy component 12 be placed inward of the outer composite material layers 11 so as to protect and thermally insulate the shape memory alloy component from the environment.

In order to embed the shape memory alloy component within the composite structure, the shape memory alloy component can be placed in a trough formed within a composite material layer. Preferably, a trough 28 is defined between a pair of adjacent composite material ribbons 25a, 25b and has approximately the same size and shape as the composite material ribbons 25 themselves. For example, during the fiber placement process, a ribbon of composite material 25 can be omitted or skipped to create a trough within the respective composite material layer. The shape memory alloy component 12 could then be laid down or inserted within this trough 28. Since the shape memory alloy component 12 is preferably the same size as the ribbons of composite material 25, the shape memory alloy component 12 will snugly and completely fill the trough 28 such that the structural integrity and strength of the resulting composite structure is not impaired.

Alternatively, in the embodiment in which a plurality of ribbons of composite material are simultaneously placed on the underlying composite layers, one of the ribbons of composite material can be replaced by the shape memory alloy component such that the shape memory alloy component is inserted between a pair of composite material ribbons, thereby further expediting the fabrication process of the present invention. Still further, a trough 28 can be routed into a consolidated plie(s) of composite material layer 11.

Regardless of the manner in which the trough is formed, it is preferred that the trough 28 be sized to match the size of the shape memory alloy component as best illustrated by FIG. 7. Thus, the shape memory alloy component will completely fill the trough without extending above the adjacent ribbons of composite material 25a, 25b to thereby minimize any dimensional mismatch of the shape memory alloy component to the surrounding composite material.

The typical width of composite material ribbon 25 is in the range of 0.240–0.250 inches. However, this width is only dictated by a guide bar currently employed in the fabrication tooling and could easily be varied to 0.1–0.5 inches or even more. It will be appreciated, therefore, that neither the width of the composite ribbon 25 nor the shape memory alloy component 12 is a limitation of the invention and composite ribbons of any number of widths would perform equivalently. Comparably, the shape memory alloy component 12 likewise has an unlimited number of widths and while preferred, does not have to match the composite ribbon width. It is envisioned that foil tendons 17 could easily function up to one foot in width depending on the application.

Figure 5B:
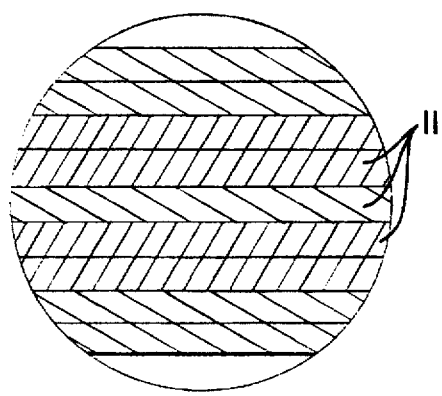
FIG. 5B is an enlarged cross-sectional view of the composite structure of FIG. 5A taken along lines 5B—5B and illustrating the relative orientations of the plurality of composite material layers.
Figure 5C:
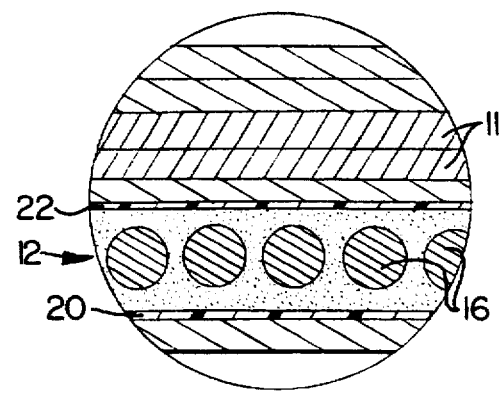
FIG. 5C is an enlarged cross-sectional view of the composite structure of FIG. 5A taken along lines 5C—5C and illustrating the orientation of the shape memory alloy component relative to the surrounding composite material layers.

Although the shape memory alloy component preferably has a size which matches the ribbons of composite material, the shape memory alloy component can be larger that the ribbon of composite material, such as thicker or wider or both. In this embodiment, a larger trough is preferably defined to receive the shape memory alloy tow. For example, two or more adjacent ribbons of composite material can be omitted to create a wider trough. Alternatively, multiple layers of composite material can be built up which each define a trough at the same relative position to create a deeper trough. For example, as illustrated in FIG. 5C, the shape memory component 12 has a thickness approximately equal to two composite ribbons of material. In any event, the trough is preferably sized to match the shape memory alloy component to minimize voids or other structural irregularities within the composite material.

Once the shape memory alloy component has been inserted between a pair of ribbons of composite material, the composite structure 10 is completed by adding additional composite layers 11 over the shape memory alloy component 12 to embed the shape memory alloy component 12 within the plurality of composite material layers 11. The shape memory alloy tendon 15 is preferably thermally insulated such that it not be heated above its transition temperature (at least along a major portion of the length of the shape memory alloy component 12) during the fabrication process. As will be understood by those of skill in the art, heating of the shape memory alloy tendon above the transition temperature will cause the shape memory alloy component tendon 15 to contract, thereby potentially deforming the surrounding composite structure. The shape memory alloy tendon is typically thermally insulated by a combination of the face sheets and the adhesive. However, the shape memory alloy component 12 can also be cooled to preclude actuation during processing and assembly of the composite structure.

As noted above, it is not uncommon for the nit area 60 to be exposed to high temperatures (above 1200° F.) and high pressures (at least 200 psi). Thus, in order to further protect the shape memory alloy component, the shape memory alloy component 12 preferably does not extend above the surface of the neighboring ribbons of composite material such that the shape memory alloy component is not exposed to undue temperatures and pressures during the consolidation of subsequent composite material layers 11. Thus, in embodiments of the fabrication process of the present invention in which the shape memory alloy component is place in a trough, it is desirable that the trough be appropriately sized to match the size of the shape memory alloy component as described above.

In order to further protect the shape memory alloy component, it is also preferable that the composite material layer 11 immediately overlying the shape memory alloy component 12 be placed in a different orientation than the orientation along which the shape memory alloy component 12 extends. As will be appreciated by those of skill in the art, by offsetting the placement orientations of the shape memory alloy component and the overlying ribbons of composite material, only a partial segment of the shape memory alloy component 12 will be heated at one time during the process of consolidating the overlying composite material layers, thereby preventing actuation of the shape memory alloy component 12 along the length.

The plurality of composite material layers 11 are also preferably laid down in at least two different orientations in order to enhance the strength and integrity of the resulting composite structure. As best illustrated by FIGS. 5B and 5C, the composite layers 11 can be placed in either a 0° or 90° orientation. In this embodiment, the 90° orientation (as indicated by left leaning hatch marks) indicates that the respective ribbon of composite material extends in a generally helical loop around the mandrel. In contrast, the 0° orientation (as indicated by right leaning hatch marks) indicates that the respective ribbon of composite material extends in a generally axial direction along the mandrel. This intermingling of ribbon orientations advantageously provides additional equilateral strength to the resulting composite structure. For example, a large complex composite structure which is formed by composite material layers which all extend in the 90° orientation would have a tendency to warp in an uncontrolled and undesirable inward manner depending on the structure's shape and heat treat process parameters. Likewise, a composite structure which is formed by composite material layers which all extend in the 0° orientation would have a tendency to warp in an uncontrolled outward manner. Referring to the exemplary embodiment of FIG. 5B, the composite layers 11 extend in 90°, 90°, 0°, 0°, 90°, 0°, 0°, 90°, and 90° orientations, respectively.

As illustrated by FIGS. 5A and 5C, one embodiment of a composite structure 10 comprises a 9-ply carbon reinforced composite material layers 11 with at least one shape memory alloy component 12 embedded therein. Also as illustrated, the shape memory alloy component 12 is placed in a trough 28 which is both inboard of the ends of the composite structure 10 and intermediate of the outer and inner layers of the plurality of composite layers 11. As such, the shape memory alloy component of this embodiment of the present invention is protected from the environment. As also illustrated by FIG. 8, it is quite possible and even preferred to use multiple shape memory alloy components 12 within a composite layer 11 of a composite structure 10. By providing a plurality of embedded shape memory alloy components, the reliability of the resulting composite structure is enhanced since if one shape memory alloy component 12 fails, the other surrounding shape memory alloy component(s) 12 could still be actuated to create the desired controlled structural deformation. It is also possible to place the shape alloy memory component 12 along only a portion of the length of the trough 28 and to fill the remainder with a ribbon of composite material 25 or to use segmented shape memory alloy tendons 15. As will be appreciated by those of skill in the art, the shape memory alloy components 12 can be placed and configured in a variety of manners with the primary limitation being dictated by the intended function and geometry of the resulting composite structure.

Even though the shape memory alloy component is disposed within an intermediate and therefore interior portion of the composite structure, the shape memory alloy component 12 is preferably externally accessible such that the shape memory alloy tendon can be actuated, such as by directing electrical current through the shape memory alloy tendon which heats and therefore actuates the shape memory alloy tendon. Preferably, the external access to the shape memory alloy component is provided via a surface egress since. As best illustrated by FIG. 8, the shape memory alloy component 12 can be egressed through a number of aligned openings defined by the underlying composite material layers 11 and through a surface egress aperture 42 in the fabrication mandrel or tool 40 which is aligned with the openings in the underlying composite material layers. The openings in the underlying composite layers can be created by routing or drilling openings with the use of a guidebar which are aligned with a previously defined slot or aperture 42 in the fabrication mandrel 40. By surface egressing the shape memory alloy component, the shape memory alloy component is readily accessible for external actuation, such as electrical resistance heating.

As described above, the fabrication method of the present invention will enable the shape memory alloy component(s) 12 to be placed in any number of directional orientations within the composite structure 10, such as transverse, longitudinal, or helical orientations. Upon actuation, the embedded shape memory alloy component(s) 12 then contracts to perform the desired structural deformation. For example, actuation of the shape memory alloy component can twist, warp, displace and or stiffen the composite structure. As will be apparent to those skilled in the art, a composite structure incorporating the shape memory alloy component of the present invention can be employed in a variety of applications. For example, the composite structure can be employed in smart structure applications, such as composite wings, engine inlets and outlets, and other control surfaces. As a result of the weight savings and performance advantages provided by the composite structure of the present invention, the operating range of an aircraft which includes a variable engine inlet geometry should be extended. As another example, the composite structure of the present invention can form an engine pedestal which is controllably deformed to dampen the vibrations of the engine.

As described above, the composite structure of the present invention includes an embedded shape memory alloy tendon which is electrically and thermally isolated from the remainder of the composite structure to provide controlled structural deformation of predetermined portions of the composite structure. In addition, the fabrication method of the present invention allows the shape memory alloy component to be readily embedded within a composite structure, such as during a fiber placement process, without actuating or otherwise damaging the shape memory alloy component and without impairing the structural integrity or strength of the composite structure. Thus, a structurally deformable composite structure can be efficiently fabricated in a manufacturing environment according to the fabrication method of the present invention.

In the drawings and the specification, there has been set forth a preferred embodiment of the invention and, although specific terms are employed, the terms are used in a generic and descriptive sense only and not for purpose of limitation, the scope of the invention being set forth in the following claims.

That which is claimed is:

1. A method of fabricating a composite structure adapted for controlled structural deformation, the method comprising the steps of:

forming a shape memory alloy component, wherein said forming step comprises the step of adhering a shape memory alloy tendon between a pair of electrically insulating face sheets, and wherein the shape memory alloy tendon has a relaxed shape at temperatures below a predetermined transition temperature and a contracted shape at temperatures above the predetermined transition temperature;

embedding the shape memory alloy component within a plurality of composite material layers such that the shape memory alloy tendon is electrically isolated from the surrounding composite material layers; and establishing electrical communication with the shape memory alloy tendon of the embedded shape memory alloy component such that subsequent actuation of the shape memory alloy tendon by raising the temperature of the shape memory alloy tendon above the predetermined transition temperature creates a controlled structural deformation of both the embedded shape memory alloy component and the surrounding composite material layers.

2. A method according to claim 1 wherein the shape memory alloy tendon is a plurality of shape memory alloy wires, and wherein said forming step further comprises the step of applying tension to the plurality of shape memory alloy wires during said adhering step such that the shape memory alloy wires are maintained in a predetermined alignment.

3. A method according to claim 1 wherein said forming step further comprises the steps of:

disposing the shape memory alloy tendon on a first electrically insulating face sheet;

applying adhesive to the shape memory alloy tendon and the first face sheet;

disposing a second electrically insulating face sheet on the shape memory alloy tendon, opposite the first face sheet; and curing the adhesive such that the shape memory alloy tendon is adhered between the first and second face sheets.

4. A method according to claim 3 wherein said forming step further comprises the step of increasing the pressure on the shape memory alloy component during said curing step to reduce void formation within the cured adhesive.

5. A method according to claim 1 wherein said embedding step comprises:

placing a plurality of ribbons of composite material in a side-by-side manner on an underlying composite material layer; and consolidating the plurality of composite material ribbons to the underlying composite material layer.

6. A method according to claim 5 wherein said forming step comprises forming the shape memory alloy component in ribbon form, and wherein said embedding step further comprises the steps of:

inserting the shape memory alloy component between a pair of composite material ribbons;

placing additional ribbons of composite material in a side-by-side manner on the inserted shape memory alloy component; and consolidating the additional composite material ribbons to thereby embed the shape memory alloy component within the resulting composite structure.

7. A method according to claim 6 wherein said inserting step comprises inserting the shape memory alloy component such that the shape memory alloy component extends in a first predetermined direction, and wherein said step of placing additional composite material ribbons on the shape memory alloy component comprises placing additional composite material ribbons on the inserted shape memory alloy component such that the additional composite material ribbons extend in a second predetermined direction, different from the first predetermined direction.

8. A method according to claim 5 wherein said forming step comprises forming the shape memory alloy component in ribbon form, wherein said placing step comprises the step of defining a trough between a pair of composite material ribbons, and wherein said embedding step further comprises the steps of:

inserting the shape memory alloy component within the trough defined between the pair of composite material ribbons;

placing additional ribbons of composite material in a side-by-side manner on the inserted shape memory alloy component; and consolidating the additional composite material ribbons to thereby embed the shape memory alloy component within the resulting composite structure.

9. A method according to claim 8 wherein said inserting step comprises inserting the shape memory alloy component within the trough such that the shape memory alloy component extends in a first predetermined direction, and wherein said step of placing additional composite material ribbons on the shape memory alloy component comprises placing additional composite material ribbons on the inserted shape memory alloy component such that the additional composite material ribbons extend in a second predetermined direction, different from the first predetermined direction.

10. A method according to claim 5 wherein said consolidating step comprises heating the plurality of composite material ribbons with a laser source as the composite material ribbons contact the underlying composite material layer to thereby bond the composite material ribbons to the underlying composite material layer.

* * * * *